(12) United States Patent
Hayashi

(10) Patent No.: US 7,491,667 B2
(45) Date of Patent: Feb. 17, 2009

(54) OPTICAL GLASS, PRECISION PRESS-MOLDING PREFORM, PROCESS FOR PRODUCING THE PREFORM, OPTICAL ELEMENT AND PROCESS FOR PRODUCING THE OPTICAL ELEMENT

(75) Inventor: Kazutaka Hayashi, Akishima (JP)

(73) Assignee: Hoya Corporation, Tokyo (JP)

( * ) Notice: Subject to any disclaimer, the term of this patent is extended or adjusted under 35 U.S.C. 154(b) by 276 days.

(21) Appl. No.: 11/081,832

(22) Filed: Mar. 17, 2005

(65) Prior Publication Data

US 2005/0204776 A1    Sep. 22, 2005

(30) Foreign Application Priority Data

Mar. 19, 2004  (JP) ............... 2004-079600

(51) Int. Cl.
*C03C 3/15* (2006.01)
*C03C 3/14* (2006.01)
*C03C 3/066* (2006.01)

(52) U.S. Cl. .............. 501/51; 501/50; 501/79

(58) Field of Classification Search ............ 501/50, 501/51, 79
See application file for complete search history.

(56) References Cited

U.S. PATENT DOCUMENTS

| | | | |
|---|---|---|---|
| 3,958,999 A * | 5/1976 | Izumitani et al. ............ 501/51 |
| 4,120,732 A * | 10/1978 | Komorita et al. ............ 501/42 |
| 4,732,875 A * | 3/1988 | Sagara ...................... 501/42 |
| 5,137,850 A * | 8/1992 | Clement et al. ............. 501/51 |
| 6,753,278 B2 | 6/2004 | Wolff et al. ................ 501/51 |
| 6,844,279 B2 | 1/2005 | Hayashi et al. |
| 6,912,093 B2 * | 6/2005 | Endo ....................... 359/642 |
| 7,138,349 B2 * | 11/2006 | Uehara et al. ............... 501/78 |
| 2003/0104919 A1 * | 6/2003 | Wolff et al. ................ 501/50 |
| 2003/0211929 A1 * | 11/2003 | Hayashi et al. ............. 501/78 |
| 2004/0235638 A1 * | 11/2004 | Uehara et al. ............... 501/78 |
| 2005/0113240 A1 | 5/2005 | Hayashi et al. |
| 2006/0194686 A1 * | 8/2006 | Kobayashi et al. ........... 501/50 |

FOREIGN PATENT DOCUMENTS

| | | |
|---|---|---|
| JP | 62-100449 | 5/1987 |
| JP | 8-26765 | 1/1996 |
| JP | 2001-072432 | 3/2001 |
| JP | 2002-249337 | 9/2002 |
| JP | 2003-201142 | 7/2003 |
| JP | 2004-175632 | 6/2004 |
| JP | 2005-154260 | 6/2005 |

OTHER PUBLICATIONS

1991 Data Book of Glass Composition, p. 106, published by Glass Manufacturers' Association of Japan (GMAJ), with English translation.

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

Provided are optical glasses having a refractive index (nd) of over 1.82 but not more than 1.86 and an Abbe's number (vd) of 30 to 39.5 and having the property of low-temperature softening that permits precision press-molding, one is an optical glass comprising $B_2O_3$, $La_2O_5$, $Gd_2O_3$ and ZnO as essential components, comprising $Li_2O$ and $SiO_2$ as optional components, provided that the content of $SiO_2$ is less than 2% by weight when $Li_2O$ is contained, having a refractive index (nd) of over 1.82 but not more than 1.86 and an Abbe's number (vd) of 30 to 39.5 and having a glass transition temperature (Tg) of 630° C. or lower, and the other is an optical glass comprising, by % by weight, 14 to 30% of $B_2O_3$, 10 to 40% of $La_2O_3$, 1 to 30% of $Gd_2O_3$ and 6 to 26% of ZnO as essential components, and comprising, as optional components, predetermined amounts of $WO_3$, $Ta_2O_5$, $Nb_2O_5$, $TiO_2$, $SiO_2$, $Li_2O$, $Na_2O$, $K_2O$, MgO, CaO, SrO, BaO, $Y_2O_3$, $Yb_2O_3$, $ZrO_2$, $Bi_2O_3$ and $Sb_2O_3$ and having a refractive index (nd) of over 1.82 but not more than 1.86, an Abbe's number (vd) of 30 to 39.5 and a glass transition temperature (Tg) of 630° C. or lower.

9 Claims, 1 Drawing Sheet

OPTICAL GLASS, PRECISION PRESS-MOLDING PREFORM, PROCESS FOR PRODUCING THE PREFORM, OPTICAL ELEMENT AND PROCESS FOR PRODUCING THE OPTICAL ELEMENT

FIELD OF THE INVENTION

The present invention relates to an optical glass, a precision press-molding preform for use in the production of an optical element by precision press-molding an optical glass, a process for producing the preform, an optical element formed of the above optical glass and a process for producing the optical element.

TECHNICAL BACKGROUND

High-refractivity low-dispersion glasses are highly demanded as materials for optical elements such as various lenses, and the like. As a glass having such optical constants, for example, there are known a dense tantalum flint glass TaSF17, etc., as disclosed on page 106 of "Glass Composition Handbook" compiled by Hiroshi Ogawa and Shinei Ogawa and issued by Japan Glass Product Industry Society (1991).

In recent years, with rapid popularization of digital cameras, video cameras, etc., demands for glass lenses as parts are increasing. On the other hand, with an increase in the number of pixels of imaging device in digital cameras, optical elements are required to have high performances, and there are demanded the ready supply of optical elements having high form accuracy.

A precision press-molding method is known as a method for highly productively producing optical elements formed of a glass having high form accuracy for supplying them. Since, however, all of conventional glasses such as TaSF17 and NbSF32 have high glass transition temperatures, they are not suitable for the precision press-molding.

DISCLOSURE OF THE INVENTION

Under the circumstances, it is an object of the present invention to provide an optical glass having a refractive index (nd) of over 1.82 but not more than 1.86 and an Abbe's number (vd) of 30 to 39.5 and having the low-temperature softening property that enables precision press-molding of the optical glass, a precision press-molding preform formed of the above optical glass, a process for producing the above preform, an optical element formed of the above optical glass and a process for producing the above optical element.

For achieving the above object, the present inventors have made diligent studies and as a result have found that the above object can be achieved by an optical glass having a specific glass composition, specific optical constants and a specific glass transition temperature, a preform formed of the above glass and an optical element formed of the above glass, and by employing a specific production method in a process for producing the above preform and a specific production method in a process for producing an optical element. On the basis of the above finding, the present invention has been accordingly completed.

That is, the present invention provides;

(1) an optical glass comprising $B_2O_3$, $La_2O_5$, $Gd_2O_3$ and ZnO as essential components, comprising $Li_2O$ and $SiO_2$ as optional components, provided that the content of $SiO_2$ is less than 2% by weight when $Li_2O$ is contained, having a refractive index (nd) of over 1.82 but not more than 1.86 and an Abbe's number (vd) of 30 to 39.5 and having a glass transition temperature (Tg) of 630° C. or lower (to be referred to as "optical glass 1" hereinafter), (2) an optical glass comprising, by % by weight,
14 to 30% of $B_2O_3$,
10 to 40% of $La_2O_3$,
1 to 30% of $Gd_2O_3$,
6 to 26% of ZnO,
0 to 20% of $WO_3$,
0 to 20% of $Ta_2O_5$,
0 to 10% of $Nb_2O_5$,
0 to 8% of $TiO_2$,
0 to 10% of $SiO_2$, provided that the content of $SiO_2$ is less than 2% when the content of $Li_2O$ is over 0%,
0 to 5% of $Li_2O$,
0 to 5% of $Na_2O$,
0 to 5% of $K_2O$,
0 to 5% of MgO,
0 to 5% of CaO,
0 to 5% of SrO,
0 to 5% of BaO,
0 to 10% of $Y_2O_3$,
0 to 10% of $Yb_2O_3$,
0 to 10% of $ZrO_2$,
0 to 10% of $Bi_2O_3$, and
0 to 1% of $Sb_2O_3$, having a refractive index (nd) of over 1.82 but not more than 1.86, an Abbe's number (vd) of 30 to 39.5 and a glass transition temperature (Tg) of 630° C. or lower (to be referred to as "optical glass 2" hereinafter), (3) a precision press-molding preform formed of the optical glass of the above (1) or (2), (4) a process for producing a precision press-molding preform, which comprises separating a molten glass gob having a predetermined weight from a molten glass flowing out of a pipe, and shaping said glass gob to produce a preform formed of the optical glass of the above (1) or (2), (5) a process for producing a precision press-molding preform, which comprises forming a shaped glass from a molten glass and processing said shaped glass to produce a preform formed of the optical glass of the above (1) or (2), (6) an optical element formed of the optical glass of the above (1) or (2), (7) a process for producing an optical element, which comprises heating the preform of the above (3) and precision press-molding the preform, (8) a process for producing an optical element, which comprises heating the preform produced by the process of the above (4) or (5) and precision press-molding the preform, (9) the process for producing an optical element as recited in the above (7) or (8), wherein a press mold and the preform are heated together and the preform is pressed with the press mold, and

(10) the process for producing an optical element as recited in the above (7) or (8), wherein the preform is preheated separately from the press mold and is introduced into the press mold preheated, to carry out precision press molding of the preform.

EFFECT OF THE INVENTION

According to the present invention, there can be provided an optical glass having a refractive index (nd) of over 1.82 but not more than 1.86 and an Abbe's number (vd) of 30 to 39.5 and having the low-temperature softening property enabling precision press molding, a precision press molding preform formed of the above glass, a process for producing the same, an optical element formed of the above optical glass and a process for producing the same.

Figure 1:
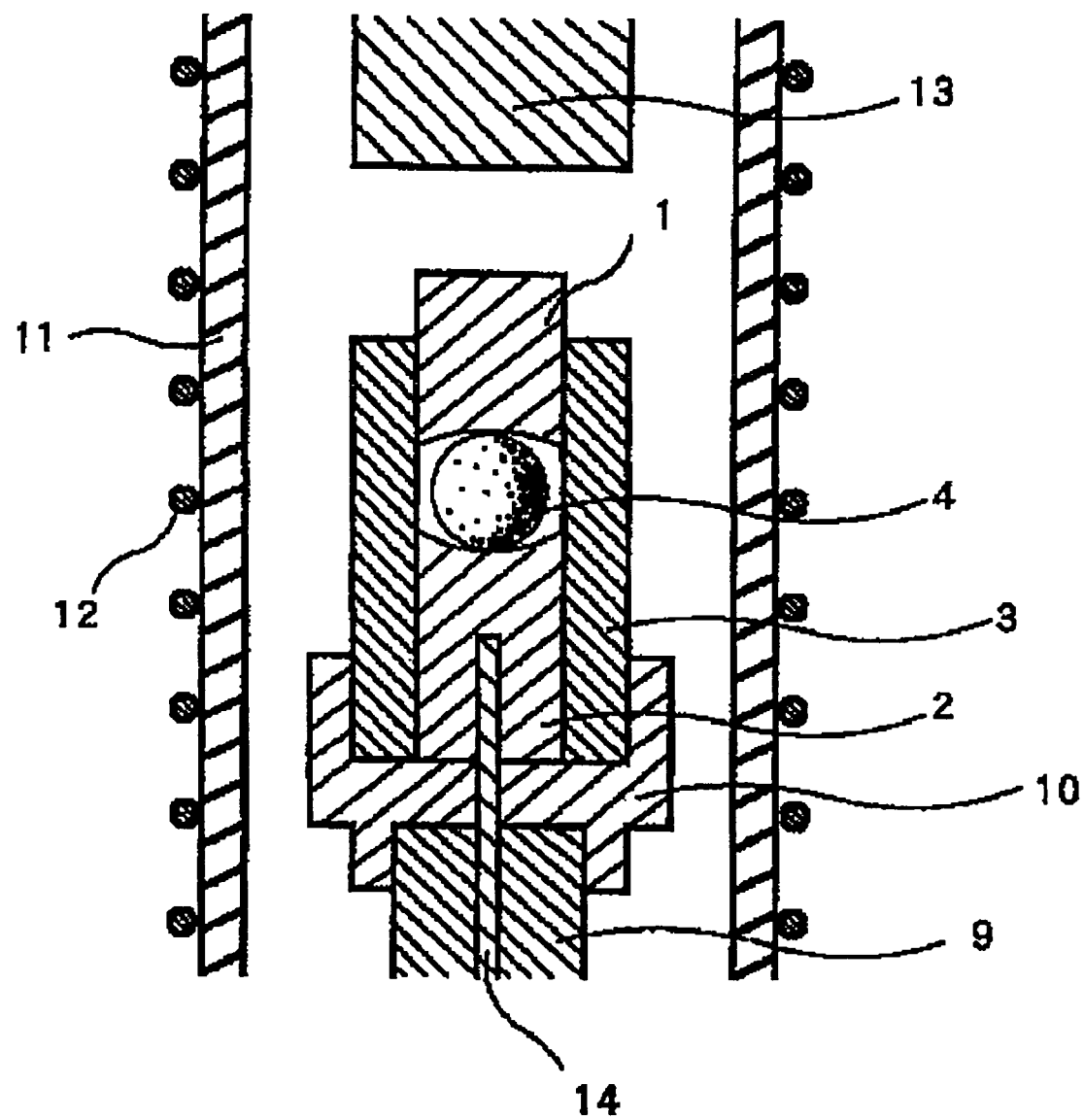
FIG. 1 is a schematic cross-sectional view of one example of a precision press molding apparatus used in e Examples.

PREFERRED EMBODIMENTS OF THE INVENTION (Optical Glass)

The optical glass of the present invention will be explained first.

The optical glass of the present invention includes two embodiments, an optical glass 1 and an optical glass 2.

The optical glass 1 is an optical glass comprising $B_2O_3$, $La_2O_5$, $Gd_2O_3$ and ZnO as essential components, comprising $Li_2O$ and $SiO_2$ as optional components, provided that the content of $SiO_2$ is less than 2% by weight when $Li_2O$ is contained, having a refractive index (nd) of over 1.82 but not more than 1.86 and an Abbe's number (vd) of 30 to 39.5 and having a glass transition temperature (Tg) of 630° C. or lower.

The optical glass 1 of the present invention contains $B_2O_3$, $La_2O_3$, $Gd_2O_3$ and ZnO as essential components. $B_2O_3$ is a component essential for constituting a glass network. $La_2O_3$ and $Gd_2O_3$ are components essential for imparting the glass with high-refractivity low-dispersion properties. When these two components are co-present, the glass is improved more in stability.

ZnO is a component for imparting the glass with the low-temperature softening property without decreasing the refractivity. Basically, the optical glass 1 of the present invention contains the above essential components, so that it materializes optical properties represented by a refractive index of over 1.82 but not more than 1.86, preferably 1.821 to 1.86 and an Abbe's number (vd) of 30 to 39.5, preferably less than 39.5, more preferably 39.4 or less, still more preferably 39.3 or less. The lower limit of the above Abbe's number (vd) is preferably 30.5 or more, more preferably 31 or more. Further, it materializes high glass stability and the low-temperature softening property represented by a glass transition temperature (Tg) of 630° C. or lower, preferably 620° C. or lower, more preferably less than 600° C.

The reason for the limitation the content of $SiO_2$ to less than 2% by weight when $Li_2O$ is contained is as will be explained later with regard to the optical glass 2 to be described below, and preferred ranges of the glass composition thereof will be also as will be explained with regard to the optical glass 2 to be described below.

The optical glass 2 of the present invention is an optical glass comprising, by % by weight, 14 to 30% of $B_2O_3$,
10 to 40% of $La_2O_3$,
1 to 30% of $Gd_2O_3$,
6 to 26% of ZnO,
0 to 20% of $WO_3$,
0 to 20% of $Ta_2O_5$,
0 to 10% of $Nb_2O_5$,
0 to 8% of $TiO_2$,
0 to 10% of $SiO_2$, provided that the content of $SiO_2$ is less than 2% when the content of $Li_2O$ is over 0%, 0 to 5% of $Li_2O$,
0 to 5% of $Na_2O$,
0 to 5% of $K_2O$,
0 to 5% of MgO,
0 to 5% of CaO,
0 to 5% of SrO,
0 to 5% of BaO,
0 to 10% of $Y_2O_3$,
0 to 10% of $Yb_2O_3$,
0 to 10% of $ZrO_2$,
0 to 10% of $Bi_2O_3$, and
0 to 1% of $Sb_2O_3$, having a refractive index (nd) of over 1.82 but not more than 1.86, an Abbe's number (vd) of 30 to 39.5 and a glass transition temperature (Tg) of 630° C. or lower Reasons for the limitation of compositional ranges in the optical glass 2 will be explained. Contents below represent contents by weight % unless otherwise specified.

$B_2O_3$ is an essential component for forming a network. When it is introduced to excess, however, the refractive index (nd) is decreased, so that the content of $B_2O_3$ is 14 to 30%, preferably 15 to 26%, more preferably 16 to 25%.

$La_2O_3$ is an essential component for imparting the glass with high-refractivity low-dispersion properties. When it is introduced to excess, however, the glass is degraded in stability, so that the content of $La_2O_3$ is 10 to 40%, preferably 12 to 38%, more preferably 14 to 36%.

$Gd_2O_3$ is an essential component also for imparting the glass with high-refractivity low-dispersion properties. When it is introduced to excess, however, the glass is degraded in stability, so that the content of $Gd_2O_3$ is 1 to 30%, preferably 1 to 25%, more preferably 1 to 20%. As is already explained, $Gd_2O_3$ has the effect of improving the glass more in stability when it is co-present with $La_2O_3$ than when it is introduced alone.

ZnO is an essential component for imparting the glass with the property of softening the glass at a low temperature while maintaining a high refractive index. When it is introduced to excess, however, the glass is degraded in stability, the content of ZnO is 6 to 26%, preferably 7 to 25%, more preferably 8 to 24%.

$WO_3$ works to improving the glass in refractivity and stability and works to decrease the liquidus temperature. When it is introduced to excess, however, the glass is degraded in stability, and the glass is colored, so that the content of $WO_3$ is 0 to 20%, preferably 0 to 18%, more preferably 1 to 18%.

$Ta_2O_5$ is a component for increasing the refractivity. When it is introduced to excess, however, the glass is degraded in stability, so that the content of $Ta_2O_5$ is 0 to 20%, preferably 0 to 18%, more preferably 1 to 18%.

$Nb_2O_5$ is also a component for increasing the refractivity. When it is introduced to excess, however, the liquidus temperature of the glass is increased, so that the content of Nb2O5 is 0 to 10%, preferably 0 to 8%, more preferably 1 to 8%.

$TiO_2$ is also a component for increasing the refractivity. When it is introduced to excess, however, the glass is degraded in stability, and the glass is colored, so that the content of $TiO_2$ is 0 to 8%, preferably 0 to 7%, more preferably 1 to 7%.

For increasing the refractivity, the total content of $WO_3$, $Ta_2O_5$, $Nb_2O_5$ and $TiO_2$ is adjusted preferably to over 10% by weight, more preferably to 11% by weight or more.

$SiO_2$ works to improve the glass in stability. When it is introduced to excess, however, not only the refractivity is decreased, but also the glass transition temperature is increased, so that the content of $SiO_2$ is 0 to 10%.

For attaining further higher refractivity while satisfying various conditions that the glass is desirably required to satisfy in the Abbe's number (vd) range of less than 39.5, preferably, the molar ratio of the content of $B_2O_3$ to the total content of $B_2O_3$ and $SiO_2$ ($B_2O_3/(B_2O_3+SiO_2)$) is adjusted to from 0.80 to 1.00.

$Li_2O$ highly effectively decreases the glass transition temperature. When it is introduced to excess, however, the refractivity is decreased, and the glass is also degraded in stability, so that the content of $Li_2O$ is 0 to 5%.

When $Li_2O$ is introduced, however, it is required to limit the content of $SiO_2$ to less than 2% by weight. Of the components that are introduced into the optical glass 2, $Li_2O$ and $SiO_2$ work, to a relatively little degree, to increase the refractivity. As described already, $Li_2O$ is a component for imparting the glass with the low-temperature softening property and $SiO_2$ is a component for improving the glass in stability. When special importance is attached to the low-temperature softening point, $Li_2O$ is introduced, and in this case, the content of $SiO_2$ is limited as described above for preventing a decrease in refractivity. The optical glass 2 can be imparted with excellent stability since $La_2O_3$ and $Gd_2O_3$ are co-present, so that the content of $SiO_2$ as a component for improving the glass in stability can be limited as described above.

When $Li_2O$ is contained, the content of $SiO_2$ is preferably 0 to 1.9%, more preferably 0 to 1.5%, preferably less than 3 mol %, more preferably 0 to 2.5 mol %. When the content of $Gd_2O_3$ is less than 5 mol %, however, the content of $SiO_2$ can be arranged to be 3 mol % or more in the above range for improving the glass in stability.

Further, when $Li_2O$ is not contained, the content of $SiO_2$ is preferably 1 to 9%, more preferably 1 to 8%.

$Na_2O$ and $K_2O$ work to improve the glass in meltability. When they are introduced to excess, however, the glass is degraded in refractivity and stability, so that the content of each of $Na_2O$ and $K_2O$ is 0 to 5%.

MgO, CaO and SrO work to improve the glass in meltability as well. When they are introduced to excess, however, the glass is degraded in refractivity and stability, so that the content of each of MgO, CaO and SrO is 0 to 5%.

BaO works to improve the glass in refractivity. When it is introduced to excess, however, the glass is degraded in stability, so that the content of BaO is 0 to 5%, preferably 0 to 4%, more preferably 0 to 3%.

$Y_2O_3$ and $Yb_2O_3$ work to impart the glass with high-refractivity low-dispersion properties. When they are introduced to excess, however, the glass is degraded in stability, so that the content of each of $Y_2O_3$ and $Yb_2O_3$ is 0 to 10%, preferably 0 to 8%, more preferably 0 to 7%. When being co-present with $La_2O_3$, $Y_2O_3$ and $Yb_2O_3$ also work to promote the function to improve the glass in stability.

In addition, it is preferred to use no $Lu_2O_3$, since $Lu_2O_3$ is an expensive component.

$ZrO_2$ works to increase the refractivity. When it is introduced to excess, however, the glass is degraded in stability, and the liquidus temperature is increased, so that the content of $ZrO_2$ is 0 to 10%, preferably 0 to 8%, more preferably 1 to 8%.

$Bi_2O_3$ works to increase the refractivity and improve the glass in stability. When it is introduced to excess, however, the glass is colored, so that the content of $Bi_2O_3$ is 0 to 10%, preferably 0 to 7%, more preferably 0 to 5%.

For improving the glass in the above properties while achieving the object of the present invention, the total content of the above components and a refining agent is preferably over 95%, more preferably over 98%, still more preferably over 99%, particularly preferably 100%.

While $GeO_2$ and $Ga_2O_3$ work to increase the refractivity and improve the glass in stability, they are expensive components, so that the content of each of $GeO_2$ and $Ga_2O_3$ is preferably 0 to 10%, more preferably 0 to 1%. It is still more preferred to use none of $GeO_2$ and $Ga_2O_3$.

In addition to the above components, refining agents can be added in a total amount of 0 to 1%. However, when refining agents are added to excess, they may damage the molding surface of a mold, particularly, a mold release film during precision press-molding, so that it is required to be careful.

Examples of the refining agents include $Sb_2O_3$, $As_2O_3$, and the like, while it is imperative to preclude the use of $As_2O_3$ by taking account of detrimental effects on the environment. In the present invention, the content of $Sb_2O_3$ is preferably 0 to 1%.

F can be introduced as well. When a molten glass is molded (shaped), however, F is volatilized from the glass to cause the occurrence of striae and make the optical constants vary, so that it is preferred to introduce no F.

Besides these, it is imperative to avoid the introduction of PbO in view of its detrimental effects on the environment and since it is reduced to adhere to the molding surface of a press mold during precision press-molding in a non-oxidizing atmosphere.

Apart from coloring the glass in order to impart the glass with the capability of absorbing light having a specific wavelength, desirably, Cu, Fe, etc., are not introduced. Further, it is also imperative to preclude CdO in view of influences on the environment.

Both the optical glasses 1 and 2 are preferred as optical glasses for press-molding, particularly for precision press-molding.

(Preform and Process for Producing the Same)

The precision press-molding preform of the present invention (to be referred to as "preform" hereinafter) is formed of the above optical glass 1 or 2.

The preform is a glass shaped material having a weight equivalent to the weight of a press-molded product. The preform is shaped in a proper form depending upon the form of a press-molded product. Examples of the form of the preform include the form of a sphere, the form of an ellipsoid of revolution, and the like. The preform is heated so as to have a viscosity that permits press-molding, and then it is press-molded.

The form of the preform is preferably a form having one axis of rotation symmetry including the above form of an ellipsoid of revolution. The above form having one axis of rotation symmetry includes a form having a smooth contour free of any corner or dent in a cross section including the above axis of rotation symmetry, such as a form having the contour of an ellipse in which the minor axis corresponds to the axis of rotation symmetry in the above cross section. Preferably, when one of angles formed by a line connecting any point on the contour of a preform in the above cross section to the center of the gravity of the preform on the axis of revolution symmetry and a tangent line contacting the contour on the above point on the contour is taken as θ, and when the above point starts at the axis of revolution symmetry and moves along the contour, the angle θ monotonously increases from 90°, then decreases monotonously and then decreases monotonously to come to be 90° at the other point where the contour crosses the axis of revolution symmetry.

The above preform may be provided with a thin film such as a mold release film on its surface as required. The mold release film includes, for example, a carbon-containing film, a self-organizing film, and the like. The above preform can be used for producing an optical element having predetermined optical constants by press-molding.

The process for producing a preform, provided by the present invention, will be explained below.

A first process for producing a preform, provided by the present invention, comprises separating a molten glass gob having a predetermined weight from a molten glass flowing out of a pipe and shaping the above glass gob into a preform formed of the above optical glass 1 or 2.

In this process, the preform is shaped in the step where the glass in a molten state cools, and the molten glass can be brought into a state where the glass is usable as a preform without mechanically processing the glass after the glass is solidified. This method has advantages that mechanically processing procedures such as cutting, grinding, polishing, etc., are obviated. Further, a preform having a smooth surface can be shaped. Further, the entire surface of the preform is a surface formed by solidification of the glass in a molten state, so that there can be obtained a smooth surface that is free of fine scratches caused by polishing or latent scratches.

The preform surface is desirably free of any cutting mark called "shear mark". The shear mark is generated when a molten glass flowing out of a pipe is cut with a cutting blade. When the shear mark remains at a stage of a precision press-molded product to which the preform is precision press-molded, such a mark portion is defective. It is therefore preferred to preclude the shear mark at a stage where the preform is shaped. The method for separating a molten glass gob using no cutting blade so that no shear mark is formed includes a method in which a molten glass is dropped from a flow pipe, or a method in which the forward end portion of a molten glass flow from a flow pipe is supported and the support is timely removed at a time when a molten glass gob having a predetermined weight can be separated (to be referred to as "descent-separation method"). In the descent-separation method, the molten glass gob is separated at a narrow portion formed between the forward end portion and the flow pipe side portion of the molten glass flow, and the molten glass gob having a predetermined weight can be obtained. Then, while the thus-obtained molten glass gob is in a softened state, the molten glass gob is shaped into a form suitable for press-molding, whereby the preform can be obtained.

Preferably, the thus-separated molten glass gob having a predetermined weight is shaped into a preform while the gob is caused to float by applying air (gas) pressure or while the gob is caused to nearly float so that the contact of the gob to a shaping mold is reduced (to be referred to as "float-shaping" hereinafter). Since the float-shaping can decrease a contact between a high-temperature glass and a shaping mold, cracking of the preform can be prevented. Further, a preform of which the entire surface is a free surface can be produced.

A second process for producing a preform, provided by the present invention, comprises forming a shaped glass (glass block etc.) from a molten glass and processing the above shaped glass (glass block etc.) formed of the optical glass 1 or 2.

In this process, there may be employed a constitution in which a molten glass is cast into a mold to form a glass shaped material formed of the above optical glass and the glass shaped material is mechanically processed to produce a preform having a predetermined weight. Before the mechanical processing, preferably, the glass is annealed to fully remove strains so that the glass is not broken.

In each of the above processes, high-quality preforms free of defects such as devitrification, striae, a scratching, a cracking, etc., can be shaped from a glass in a molten state since the optical glasses 1 and 2 have high stability.

(Optical Element and Process for Producing the Same)

The optical element of the present invention has a feature that it is formed of the above optical glass 1 or 2. According to the present invention, there can be provided various optical elements owing to optical properties that the above optical glasses have. Examples of the optical element include various lenses such as a spherical lens, an aspherical lens, a microlens, etc., a diffracting grating, a lens with a diffraction grating, a lens array, a prism, and the like.

The above optical element may be provided with an optical thin film such as an antireflection film, a total reflection film, a partial reflection film, a film having spectral properties, or the like as required.

The process for producing an optical element, provided by the present invention, will be explained below.

A first process for producing an optical element comprises heating the above preform and precision press-molding the same.

A second process for producing an optical element comprises heating a preform produced by the above production process and precision press-molding the same.

The above precision press-molding is also called "mold optics molding" and is well know in the field of this art. That surface of an optical element which transmits, refracts, diffracts or reflects light is called "optical-function surface" (for example, an aspherical surface of an aspherical lens or a spherical surface of a spherical lens corresponds to the optical-function surface). According to the precision press-molding, the optical-function surface can be formed by precisely transferring the molding surface of a press mold to a glass, and the mechanical processing procedures such as grinding, polishing, etc., are not required for finishing the optical-function surface.

Therefore, the process of the present invention is suitable for producing optical elements such as a lens, a lens array, a diffraction grating, a prism, etc., and is particularly suitable for highly productively producing aspherical lenses.

According to each of the processes for producing an optical element, optical elements having the above optical properties can be produced. Further, since the glass has a low glass transition temperature (Tg), and the temperature for the press-molding can be hence decreased, so that damage of the molding surface of a press mold is decreased. As a result, the lifetime of the press mold can be increased. Further, since the glass constituting the preform has high stability, the devitrification of the glass in the steps of reheating and pressing can be effectively prevented. Further, a series of steps starting at melting of the glass and ending with obtaining of a final product can be highly productively carried out.

The press mold for the precision press-molding can be selected from known press molds, such as press molds that are made, as mold materials, from refractory ceramics such as silicon carbide, zirconia, alumina, etc., and have a mold release film on the molding surface of each mold material. Of these, a press mold made of silicon carbide is preferred. The mold release film can be selected from a carbon-containing film, or the like. A carbon film is preferred in view of durability and a cost.

In the precision press-molding, desirably, a non-oxidizing atmosphere is employed as an atmosphere for the precision press-molding for maintaining the molding surface of a press mold under excellent conditions. The non-oxidizing gas is preferably selected from nitrogen or a gas mixture of nitrogen with hydrogen.

Two embodiments of the process for producing an optical element, provided by the present invention, will be explained below.

(Precision Press-molding 1)

This process comprises heating a press mold and a preform together and pressing the preform with the press mold (to be referred to as "precision press-molding 1" hereinafter).

In the precision press-molding 1, preferably, the press mold and the preform are together heated to a temperature at which the glass constituting the preform exhibits a viscosity of $10^6$ to $10^{12}$ dPa·s, and the preform is precision press-molded with the press mold.

Further, desirably, a precision press-molded product is cooled to a temperature at which the above glass exhibits a viscosity of $10^{12}$ dPa·s or higher, preferably $10^{14}$ dPa·s or higher, more preferably $10^{16}$ dPa·s or higher before it is taken out of the press mold.

Under the above conditions, not only the form of molding surface of the press mold can be precisely transferred to the glass, but also a precision press-molded product can be taken out of the press mold without any deformation.

(Precision Press-molding 2)

This process comprises introducing a preform preheated separately from a press mold into the preheated press mold, and precision press-molding the preform (to be referred to as "precision press-molding 2" hereinafter).

According to this process, the preform is preheated before it is introduced into the press mold, so that optical elements free of surface defects and excellent in surface accuracy can be produced while the cycle time can be decreased.

Preferably, the temperature for preheating the press mold is set at a temperature lower than the temperature for preheating the preform. When the temperature for preheating the press mold is set at a lower temperature as described above, the attrition of the above press mold can be decreased.

In the precision press-molding 2, preferably, the press mold is preheated to a temperature at which the glass constituting the preform exhibits a viscosity of $10^9$ dPa·s or less, more preferably $10^6$ to $10^9$ dPa·s.

While the above preform is caused to float, preferably, it is preheated, and further preferably, the preform is preheated to a temperature at which the glass constituting the preform exhibits a viscosity of $10^{5.5}$ to $10^9$ dPa·s, more preferably $10^{5.5}$ dPa·s or more but less than $10^9$ dPa·s.

Further, preferably, the cooling of the glass is started simultaneously with the start of the pressing or during the pressing.

The press mold is temperature-adjusted to a temperature lower than the temperature employed for preheating the above preform. As a criterion, there can be employed a temperature at which the above glass exhibits a viscosity of $10^9$ to $10^{12}$ dPa·s.

In the above process, preferably, a precision press-molded product is taken out of the press mold after it is cooled to a temperature at which the glass exhibits a viscosity of $10^{12}$ dPa·s or more.

The optical element obtained by the precision press-molding is taken out of the press mold and gradually cooled as required. When the precision press-molded product is an optical element such as a lens, the product is surface-coated with an optical thin film as required.

EXAMPLES

The present invention will be further explained below with reference to Examples, while the present invention shall not be limited by these Examples.

EXAMPLES (1) Tables 1 to 3 show compositions, refractive indexes (nd), Abbe's numbers (vd), transition temperatures (Tg) and sag temperatures of glasses in Examples. With regard to each of the glasses, oxides, hydroxides, carbonates, nitrates, etc., as raw materials corresponding to components therefor were used, and these raw materials were weighed so as to give a composition shown in Tables 1 to 3 after they are formed into a glass, fully mixed, then, poured into a platinum crucible and melted under heat at a temperature range of 1,200 to 1,250° C. with an electric furnace with stirring in atmosphere for 2 to 4 hours. A homogenized and refined glass melt was cast into a 40×70×15 mm mold made of carbon. The cast glass was allowed to cool to a glass transition temperature, and, immediately thereafter, it was placed in an annealing furnace, annealed around the glass transition temperature for 1 hour and gradually cooled in the annealing furnace to room temperature, to give each glass. The thus-obtained glasses were visually enlarged and viewed through a microscope to show neither the precipitation of a crystal nor the remaining of non-melted raw materials.

Each of the above optical glasses was measured for a refractive index (nd), an Abbe's number (vd), a glass transition temperature (Tg) and a sag temperature (Ts) as follows.

(1) Refractive index (nd) and Abbe's number (vd)

An optical glass obtained at a gradually cooling rate of −30° C./hour was measured.

(2) Glass transition temperature (Tg) and sag temperature (Ts)

Measured with an apparatus for thermomechanical analysis supplied by Rigaku Corporation at a temperature elevation rate of 4° C./minute.

All the glasses exhibited the low-temperature softening property and meltability and were suitable as glasses for precision press-molding.

TABLE 1

| | | Run No. | | | | | |
|---|---|---|---|---|---|---|---|
| | | 1 | 2 | 3 | 4 | 5 | 6 |
| Composition (wt %) | $B_2O_3$ | 18.35 | 18.56 | 18.93 | 19.01 | 17.82 | 18.76 |
| | $La_2O_3$ | 31.06 | 24.03 | 28.28 | 32.17 | 31.50 | 31.75 |
| | $Gd_2O_3$ | 6.10 | 14.39 | 6.29 | 6.32 | 6.19 | 6.23 |
| | ZnO | 19.17 | 19.39 | 19.78 | 17.96 | 19.44 | 19.60 |
| | $WO_3$ | 15.60 | 15.78 | 16.10 | 16.16 | 15.82 | 15.95 |
| | $Ta_2O_5$ | 4.96 | 0.00 | 0.00 | 0.00 | 0.00 | 0.00 |
| | $Nb_2O_5$ | 2.98 | 6.03 | 6.15 | 6.18 | 6.05 | 3.05 |
| | $TiO_2$ | 1.79 | 1.81 | 1.85 | 1.86 | 1.82 | 1.83 |
| | $Li_2O$ | 0.00 | 0.00 | 0.00 | 0.35 | 0.00 | 0.00 |

TABLE 1-continued

|  |  | Run No. | | | | | |
| --- | --- | --- | --- | --- | --- | --- | --- |
|  |  | 1 | 2 | 3 | 4 | 5 | 6 |
|  | $SiO_2$ | 0.00 | 0.00 | 0.00 | 0.00 | 1.37 | 0.00 |
|  | $ZrO_2$ | 0.00 | 0.00 | 0.00 | 0.00 | 0.00 | 2.83 |
|  | $Yb_2O_3$ | 0.00 | 0.00 | 0.00 | 0.00 | 0.00 | 0.00 |
|  | Total | 100 | 100 | 100 | 100 | 100 | 100 |
| Properties | Tg (° C.) | 567 | 569 | 569 | 559 | 569 | 567 |
|  | Ts (° C.) | 607 | 609 | 609 | 599 | 609 | 607 |
|  | nd | 1.8599 | 1.8595 | 1.8593 | 1.8587 | 1.8583 | 1.8579 |
|  | νd | 36.0 | 35.4 | 35.4 | 35.5 | 35.2 | 36.6 |

TABLE 2

|  |  | Run No. | | | | | |
| --- | --- | --- | --- | --- | --- | --- | --- |
|  |  | 7 | 8 | 9 | 10 | 11 | 12 |
| Composition (wt %) | $B_2O_3$ | 18.81 | 18.45 | 19.30 | 18.96 | 16.93 | 16.47 |
|  | $La_2O_3$ | 31.83 | 18.37 | 32.68 | 23.44 | 31.32 | 27.41 |
|  | $Gd_2O_3$ | 6.25 | 20.44 | 6.42 | 18.63 | 6.15 | 11.43 |
|  | ZnO | 19.64 | 19.27 | 16.32 | 17.56 | 19.33 | 14.55 |
|  | $WO_3$ | 10.66 | 15.68 | 16.41 | 14.30 | 15.73 | 14.63 |
|  | $Ta_2O_5$ | 5.08 | 0.00 | 0.00 | 0.00 | 0.00 | 13.94 |
|  | $Nb_2O_5$ | 3.06 | 5.99 | 6.27 | 5.46 | 6.01 | 0.00 |
|  | $TiO_2$ | 1.84 | 1.80 | 1.89 | 1.64 | 1.81 | 0.00 |
|  | $Li_2O$ | 0.00 | 0.00 | 0.71 | 0.00 | 0.00 | 0.31 |
|  | $SiO_2$ | 0.00 | 0.00 | 0.00 | 0.00 | 2.72 | 1.26 |
|  | $ZrO_2$ | 2.83 | 0.00 | 0.00 | 0.00 | 0.00 | 0.00 |
|  | $Yb_2O_3$ | 0.00 | 0.00 | 0.00 | 0.00 | 0.00 | 0.00 |
|  | Total | 100 | 100 | 100 | 100 | 100 | 100 |
| Properties | Tg (° C.) | 567 | 571 | 551 | 572 | 571 | 583 |
|  | Ts (° C.) | 607 | 611 | 591 | 612 | 611 | 630 |
|  | nd | 1.8579 | 1.8577 | 1.8555 | 1.8551 | 1.8547 | 1.8543 |
|  | νd | 37.4 | 35.6 | 35.8 | 36.2 | 35.2 | 37.7 |

TABLE 3

|  |  | Run No. | | | | |
| --- | --- | --- | --- | --- | --- | --- |
|  |  | 13 | 14 | 15 | 16 | 17 |
| Composition (wt %) | $B_2O_3$ | 19.61 | 20.15 | 20.39 | 20.51 | 20.27 |
|  | $La_2O_3$ | 33.20 | 30.79 | 31.16 | 31.35 | 30.97 |
|  | $Gd_2O_3$ | 6.52 | 4.28 | 8.67 | 10.90 | 6.46 |
|  | ZnO | 14.63 | 20.19 | 20.43 | 20.55 | 20.31 |
|  | $WO_3$ | 16.68 | 16.43 | 11.09 | 8.37 | 13.77 |
|  | $Ta_2O_5$ | 0.00 | 0.00 | 0.00 | 0.00 | 0.00 |
|  | $Nb_2O_5$ | 6.37 | 6.28 | 6.36 | 6.39 | 6.32 |
|  | $TiO_2$ | 1.92 | 1.89 | 1.91 | 1.92 | 1.90 |
|  | $Li_2O$ | 1.07 | 0.00 | 0.00 | 0.00 | 0.00 |
|  | $SiO_2$ | 0.00 | 0.00 | 0.00 | 0.00 | 0.00 |
|  | $ZrO_2$ | 0.00 | 0.00 | 0.00 | 0.00 | 0.00 |
|  | $Yb_2O_3$ | 0.00 | 0.00 | 0.00 | 0.00 | 0.00 |
|  | Total | 100 | 100 | 100 | 100 | 100 |
| Properties | Tg (° C.) | 543 | 567 | 570 | 572 | 569 |
|  | Ts (° C.) | 583 | 607 | 612 | 612 | 609 |
|  | nd | 1.8523 | 1.8493 | 1.8483 | 1.8468 | 1.8463 |
|  | νd | 36.1 | 35.3 | 36.6 | 37.4 | 36.0 |

(2) Then, each of refined and homogenized molten glasses corresponding to the above glasses was caused to flow, at a constant rate, out of a pipe made of a platinum alloy that was temperature-adjusted to a temperature region capable of causing the glass to flow out without any devitrification, and a molten glass gob having the weight of an intended preform was separated by a dropping method or a descent-separation method, received with a receiving mold provided with a gas ejection port in the bottom thereof and shaped into a precision press-molding preform while the glass gob was caused to float by ejecting a gas from the gas ejection port. The intervals for separating the molten glass were adjusted and set for obtaining spherical preforms and preforms having the form of a flattened sphere each. The preforms had weights that were precisely equivalent to set values, and all the preforms had smooth surfaces.

As another method for producing a preform, there was employed a method in which a molten glass is cast into a mold to form a plate-shaped glass, and the plate-shaped glass is annealed, then, cut and surface-ground and polished to form a preform of which the entire surface is smooth.

(3) Preforms each of which the entire surface was formed by solidification of a glass in a molten state and preforms each of which the entire surface was smooth by surface-grounding and polishing, obtained in the above manner, were precision press-molded with a precision press-molding apparatus shown in FIG. 1, to give aspherical lenses. Specifically, a preform 4 was placed between a lower mold member 2 and an upper mold member 1 constituting a press mold, a nitrogen atmosphere was introduced into a quartz tube 11, and a heater 12 was electrically powered to heat the inside of the quartz tube 11. The temperature inside the press mold was set at a temperature at which the glass exhibited a viscosity of $10^8$ to $10^{10}$ dPa·s, and while this temperature was maintained, a pressing rod 13 was moved downward to press the upper mold member 1, so that the preform 4 set in the press mold was pressed. The pressure for the pressing was set at 8 MPa, and the time period for the pressing was adjusted to 30 seconds. After the pressing, the pressure for the pressing was removed, and in a state where a glass molded product obtained by the press-molding was in contact with the lower mold member 2 and the upper mold member 1, the glass molded product was gradually cooled to a temperature at which the above glass had a viscosity of $10^{12}$ dPa·s or more. Then, the glass molded product was rapidly cooled to room temperature and taken out of the press mold to give an aspherical lens. Aspherical lenses obtained in the above manner were lenses having remarkably high surface accuracy. In FIG. 1, numeral 3 indicates a sleeve member, numeral 9 indicates a support rod, numeral 10 indicates a support bed, and numeral 14 indicates a thermocouple.

Each aspherical lens obtained by the precision press-molding may be provided with an antireflection film as required.

Similar preforms were precision press-molded according to other method. In this method, while a preform is caused to float, the preform is preheated to a temperature at which the glass constituting the preform has a viscosity of $10^8$ dPa·s. Separately, a press mold having an upper mold member, a lower mold member and a sleeve member is heated up to a temperature at which the above glass exhibits a viscosity of $10^9$ to $10^{12}$ dPa·s, and the preheated preform is introduced into the cavity of the press mold to carry out precision press-molding. The pressure for the pressing was set at 10 MPa. Upon start of the pressing, the cooling of the press mold was started, the cooling was continued until the molded glass had a viscosity of $10^{12}$ dPa·s or more, and a molded product was taken out of the mold to give an aspherical lens. Aspherical lenses obtained in the above manner had remarkably high surface accuracy.

Each aspherical lens obtained by the precision press-molding may be provided with an antireflection film as required.

In the above manner, optical elements formed of a glass having excellent weather resistance and having high internal qualities were highly productively obtained.

INDUSTRIAL UTILITY

The optical glass of the present invention has a refractive index (nd) of over 1.82 but not more than 1.86 and an Abbe's number (vd) of 30 to 39.5 and has the low-temperature softening property that permits precision press-molding. The optical element formed of the above glass, provided by the present invention is used, for example, as various lenses such as a spherical lens, an aspherical lens, a microlens, etc., a diffraction grating, a lens with a diffraction grating, a lens array, and the like.

The invention claimed is:

1. An optical glass comprising, by % by weight,
   14 to 30% of $B_2O_3$,
   10 to 40% of $La_2O_3$,
   1 to 30% of $Gd_2O_3$,
   6 to 26% of ZnO,
   0 to 20% of $WO_3$,
   0 to 20% of $Ta_2O_5$,
   0 to 10% of $Nb_2O_5$,
   0 to 8% of $TiO_2$,
   0 to 10% of $SiO_2$,
   provided that the content of $SiO_2$ is 0 to 1.9% when the content of $Li_2O$ is over 0%,
   0 to 5% of $Li_2O$,
   0 to 5% of $Na_2O$,
   0 to 5% of $K_2O$,
   0 to 5% of MgO,
   0 to 5% of CaO,
   0 to 5% of SrO,
   0 to 5% of BaO,
   0 to 10% of $Y_2O_3$,
   0 to 10% of $Yb_2O_3$,
   0 to 10% of $ZrO_2$,
   0 to 10% of $Bi_2O_3$,
   0 to 1% of $Sb_2O_3$,
   and the optical glass is devoid of F and PbO having a refractive index (nd) of over 1.82 but not more than 1.86, an Abbe's number (vd) of 30 to 39.5 and a glass transition temperature (Tg) of 630° C. or lower.

2. A precision press-molding preform formed of the optical glass of claim 1.

3. A process for producing a precision press-molding preform, which comprises separating a molten glass gob having a predetermined weight from a molten glass flowing out of a pipe, and shaping said glass gob to produce a preform formed of the optical glass of claim 1.

4. A process for producing a precision press-molding preform, which comprises forming a shaped glass from a molten glass and processing said shaped glass to produce a preform formed of the optical glass of claim 1.

5. An optical element formed of the optical glass of claim 1.

6. A process for producing an optical element, which comprises heating the preform of claim 2 and precision press-molding the preform.

7. A process for producing an optical element, which comprises heating the preform produced by the process of claim 3 and precision press-molding the preform.

8. The process for producing an optical element as recited in claim 6, wherein a press mold and the preform are heated together and the preform is pressed with the press mold.

9. The process for producing an optical element as recited in claim 6, wherein the preform is preheated separately from the press mold and is introduced into the press mold preheated, to carry out precision press molding of the preform.

* * * * *